US010622809B2

(12) United States Patent
Kraft

(10) Patent No.: US 10,622,809 B2
(45) Date of Patent: Apr. 14, 2020

(54) METHOD AND SUPPLY SYSTEM FOR THE DECENTRALIZED PROVISION OF ENERGY

(71) Applicant: PEKRA GMBH, Puchheim (DE)

(72) Inventor: Peter Kraft, Schnelldorf (DE)

(73) Assignee: PEKRA GmbH, Germering (DE)

( * ) Notice: Subject to any disclaimer, the term of this patent is extended or adjusted under 35 U.S.C. 154(b) by 478 days.

(21) Appl. No.: 15/509,654

(22) PCT Filed: Aug. 31, 2015

(86) PCT No.: PCT/DE2015/200445
§ 371 (c)(1),
(2) Date: Mar. 8, 2017

(87) PCT Pub. No.: WO2016/037619
PCT Pub. Date: Mar. 17, 2016

(65) Prior Publication Data
US 2017/0264096 A1    Sep. 14, 2017

(30) Foreign Application Priority Data

Sep. 9, 2014 (DE) .................... 10 2014 218 031

(51) Int. Cl.
*H02J 3/32* (2006.01)
*H02J 7/34* (2006.01)
(Continued)

(52) U.S. Cl.
CPC ............. *H02J 3/008* (2013.01); *B60L 53/12* (2019.02); *B60L 53/30* (2019.02); *B60L 55/00* (2019.02);
(Continued)

(58) Field of Classification Search
CPC .... H02J 3/008; H02J 3/32; H02J 3/382; H02J 7/34; B60L 53/12; B60L 55/00; B60L 53/30; G06Q 50/06
See application file for complete search history.

(56) References Cited

U.S. PATENT DOCUMENTS

| 9,744,858 B2* | 8/2017 | Hall .................... B60L 1/00 |
| 2007/0005192 A1* | 1/2007 | Schoettle ............... H02J 3/32 |
| | | 700/286 |

(Continued)

FOREIGN PATENT DOCUMENTS

| DE | 102010015758 A1 | 1/2011 |
| EP | 2 450 844 A2 | 5/2012 |

(Continued)

OTHER PUBLICATIONS

Liu et al.: "Opportunities and Challenges of Vehicle-to-Home, Vehicle-to-Vehicle, and Vehicle-to-Grid Technologies", Proceedings of the IEEE, New York, US, vol. 101, No. 11, Nov. 1, 2013, pp. 2409-2427, XP011529855.

(Continued)

*Primary Examiner* — Ronald D Hartman, Jr.
(74) *Attorney, Agent, or Firm* — Young & Thompson

(57) ABSTRACT

Disclosed is a method for the decentralized provision of energy, preferably electricity or heat. In the method, a plurality of decentralized energy producers (1) and/or energy suppliers is located in a definable geographic region, and the energy is transported between the energy producers (1), energy suppliers, energy buyers and/or energy consumers (2) according to the offer and/or demand by mobile storage units (3), without using any cable system. A corresponding supply system for the decentralized provision of energy is also disclosed.

20 Claims, 1 Drawing Sheet

(51) Int. Cl.
  *B60L 53/12* (2019.01)
  *B60L 55/00* (2019.01)
  *B60L 53/30* (2019.01)
  *G06Q 50/06* (2012.01)
  *H02J 3/00* (2006.01)
  *H02J 3/38* (2006.01)
  *H01M 10/42* (2006.01)

(52) U.S. Cl.
  CPC ............... *G06Q 50/06* (2013.01); *H02J 3/32* (2013.01); *H02J 3/382* (2013.01); *H02J 7/34* (2013.01); *B60L 2200/12* (2013.01); *B60L 2200/18* (2013.01); *B60L 2200/26* (2013.01); *B60L 2200/28* (2013.01); *H01M 10/4257* (2013.01); *Y02E 60/721* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y04S 10/126* (2013.01); *Y04S 50/10* (2013.01)

(56) References Cited

U.S. PATENT DOCUMENTS

| | | | | |
|---|---|---|---|---|
| 2009/0037123 | A1* | 2/2009 | Noujima | G06Q 10/06 702/60 |
| 2011/0025267 | A1* | 2/2011 | Kamen | B60L 8/003 320/109 |
| 2011/0130885 | A1* | 6/2011 | Bowen | B60L 3/12 700/291 |
| 2011/0282807 | A1 | 11/2011 | Colello et al. | |
| 2012/0109797 | A1* | 5/2012 | Shelton | B60L 3/0069 705/34 |
| 2013/0030581 | A1* | 1/2013 | Luke | B60L 1/003 700/286 |
| 2013/0073104 | A1 | 3/2013 | Sciacchitano | |
| 2013/0345884 | A1* | 12/2013 | Forbes, Jr. | G05B 15/02 700/286 |
| 2014/0231284 | A1 | 8/2014 | Ansari | |
| 2014/0277788 | A1* | 9/2014 | Forbes, Jr. | G05F 1/66 700/286 |
| 2015/0160672 | A1* | 6/2015 | Hakim | B60L 53/665 700/291 |
| 2015/0303689 | A1* | 10/2015 | Collantes | H02S 50/10 700/295 |
| 2017/0174092 | A1* | 6/2017 | Kohnke | B60L 11/1824 |

FOREIGN PATENT DOCUMENTS

| | | |
|---|---|---|
| JP | 2001-184406 A | 7/2001 |
| JP | 2004-015882 A | 1/2004 |
| JP | 2008-131841 A | 6/2008 |
| JP | 2011-155714 A | 8/2011 |
| JP | 2011-205728 A | 10/2011 |
| JP | 2011-205858 A | 10/2011 |
| WO | 2009045349 | 4/2009 |
| WO | 2012110064 | 8/2012 |

OTHER PUBLICATIONS

Tu Yiyun et al.: "Research on Vehicle-to-Grid Technology", Computer Distributed Control and Intelligent Environmental Monitoring (CDCIEM), Feb. 19, 2011, pp. 1013-1016, XP031938686.

Pardis Khayyer et al.: "Power management strategies for hybrid electric trucks in smart-grids", Innovative Smart Grid Technologies (ISGT), Jan. 16, 2012, pp. 1-3, XP032153815.

McCulley: "Mobile Elemental Power Plant (MEPP): MEPP", 2013 1st IEEE Conference on Technologies for Sustainability (SUSTECH), IEEE, Aug. 1, 2013, pp. 109-113, XP032494760.

International Preliminary Report on Patentability and Written Opinion of the International Searching Authority PCT/DE2015/200445 dated Dec. 22, 2015.

Office Action for European Patent Application No. 15 781 017.7 dated Oct. 17, 2018 with English machine translation provided.

Office Action for Japanese Patent Application No. 2017-531958 dated Jul. 9, 2019 with English translation provided.

* cited by examiner

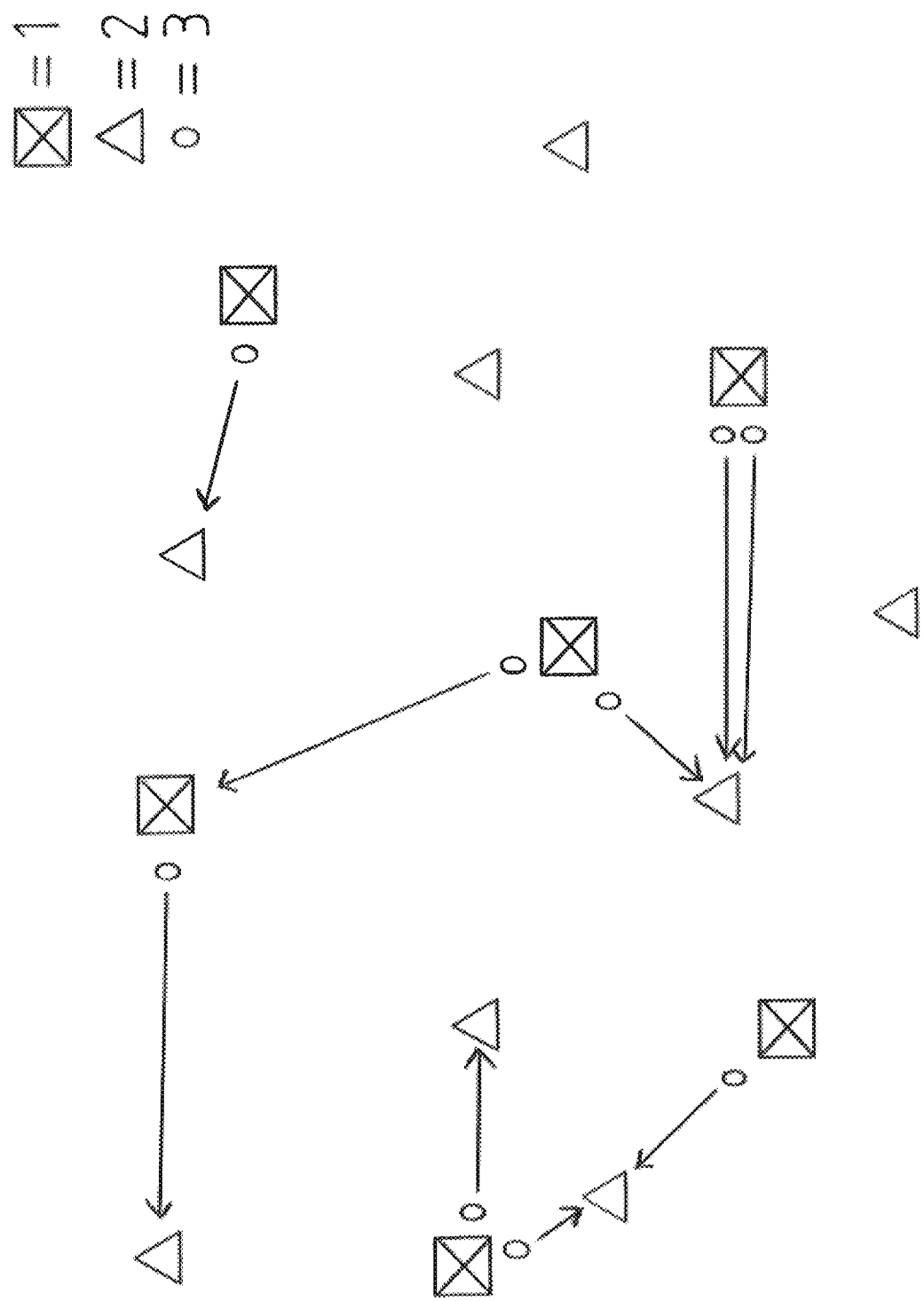

METHOD AND SUPPLY SYSTEM FOR THE DECENTRALIZED PROVISION OF ENERGY

BACKGROUND OF THE INVENTION

Field of the Invention

This invention relates to a method for the decentralized provision of energy, preferably electrical energy or heat, whereby multiple decentralized energy producers and/or energy suppliers are arranged in a definable geographic area, and whereby the energy is transported between energy producers, energy suppliers, energy buyers, and/or energy consumers according to the supply and/or demand by means of movable storage units—without using any power line system.

In addition, this invention relates to a supply system for decentralized provision of energy, preferably electrical energy or heat, in particular for implementing the method according to the claims, whereby multiple decentralized energy producers and/or energy suppliers are arranged in a definable geographic area and whereby the energy can be transported between energy producers, energy suppliers, energy buyers, and/or energy consumers according to the supply and/or demand by means of movable storage units—without using any power line system.

Description of the Related Art

A common method and supply system for the provision of energy, here by way of example in the form of electrical energy, is embodied by the power supply system that is used in, for example, Germany. In this case, power is generated by different producers by means of, for example, nuclear power plants, coal-fired power plants, or else power plants for renewable power, for example wind power plants, hydroelectric power plants, or solar power plants. The power that is generated in this connection is fed into a pool and distributed to consumers via the known power line system. In this connection, as reliable a power supply as possible is ensured by consumers connected to the power supply system.

In this known method and supply system for the provision of electrical energy, however, it is unsatisfactory that because of the introduction of all power generated by different types of power plants and the mixing of the differently generated power that results therefrom, it is not possible for a consumer to obtain, for example, exclusively renewable power. Ultimately, a consumer is forced to order mixed, so-called "gray electricity." This ultimately prevents the distribution and expansion of the generation of renewable power, since consumers—rightly or wrongly—often cannot be quite certain whether they are also ordering an actually renewable power and therefore can be enthusiastic only to a limited extent regarding the ordering of renewable power.

BRIEF SUMMARY OF THE INVENTION

The object of this invention is therefore to indicate a method as well as a supply system for the provision of energy, whereupon a determination as to a definable type of power or type of energy with means that are simple in design is made possible.

According to the invention, the above object, on the one hand, is achieved by a method for decentralized provision of energy and, on the other hand, by a supply system for decentralized provision of energy.

In a way according to the invention, it first became known that a provision of energy even without using the known power line system is possible. In another way according to the invention, it then became known that the provision of energy can be carried out via a transport system, which operates between energy producers, energy suppliers, energy buyers, and/or energy consumers on the basis of movable storage units—without using any power line system. Specifically, in this connection, a decentralized provision of energy based on decentralized energy producers and/or energy suppliers is carried out, whereby the energy producers and/or energy suppliers are arranged in a decentralized manner in a definable geographic area. The energy is transported between producers, suppliers, buyers, and/or consumers according to the supply and/or demand. In this connection, individual transport pathways can be defined and created, whereby, for example, the type of power can be determined based on the respective producers and/or suppliers and the underlying type of power plant.

Consequently, a suitable method and supply system are indicated with the method according to the invention and the supply system according to the invention for decentralized provision of energy, whereupon a determination as to a definable type of power or type of energy with means that are simple in design is made possible.

To ensure a transport of energy that is very reliable, on the one hand, and very simple, on the other hand, a movable storage unit can be assigned to a motor vehicle. In this connection, the motor vehicle can be used as a "power line," so to speak, in the arrangement that consists of producers, suppliers, buyers, and/or consumers. Depending on the need, in this connection energy can be transported from one site with corresponding supply to a site with corresponding demand.

In principle, a movable storage unit can be a commercially available battery. Such batteries exist in the most varied embodiments and sizes.

In the case of an actual embodiment, the motor vehicle can be a passenger car, a truck, a bus, a motorcycle, a train car, or a trailer. There are no restrictions whatsoever as regards the type of transporting motor vehicle. It must only be suitable to transport a movable storage unit between desired sites. For example, a movable storage unit could be designed as an underbody in a trailer. Thus, a trailer could perform a dual function, namely, on the one hand, the transport of a provided transport material and, on the other hand, the transport of energy.

In an advantageous configuration, the motor vehicle can be driven electrically. In this connection, a transported electrical energy can also be used at least partially for driving the transport vehicle.

Often, energy producers and/or energy suppliers have more energy than is requested at present. In this respect, it is advantageous to assign to the producers and/or suppliers storage units for the energy, which units can be used as buffers, so to speak, for generated or preserved energy. Such storage units can be, on the one hand, movable storage units, or else stationary storage units, which are used only for this purpose of buffering or storing on the spot.

Specifically, the producers and/or suppliers can form a decentralized supply system. Such a decentralized supply system can supply a definable geographic area with energy.

In an especially advantageous way, the energy can be renewable. In this connection, an efficient contribution to environmental protection is ensured. Specifically, the energy can be produced by the sun, wind, hydroelectric power, heat, geothermal energy, or biomass, or else other forms of energy. In the case of all of these generating mechanisms, the use of fossil fuel sources is eliminated. For more reliable allocation of existing energy and more reliable supplying of buyers and/or consumers with energy, the supply and/or demand relative to energy can be administered by a central computer. In this connection, a more efficient operation of a supply system according to the invention is ensured.

In addition, with respect to an efficient method and an efficient supply system for decentralized provision of energy, a monitoring of the supply and/or demand relative to energy can be made possible via the Internet. In this respect, producers, suppliers, buyers, and/or consumers can—in a simple way—produce an overview on the existing supply and/or demand relative to energy. This overview can be used immediately for a corresponding use case. In an advantageous way, this monitoring could be made possible only by registered users. In this respect, the users must register as users before a corresponding monitoring period. This could be carried out for an appropriate fee. With a view to an especially simple monitoring of the supply and/or demand, the monitoring could be carried out via an application software, an app.

For another efficient use of the method or supply system according to the invention, a reserving of, ordering of, and/or paying for energy can be carried out via an application software, an app. In this respect, a simple provision of the above-mentioned functionalities is ensured. In principle, an application software as described above can be run on any suitable electronic devices, for example on a cell phone. In addition to the Internet, an exchange via the analog telephone lines can also be usefully carried out, since these lines are least susceptible to terrorist attacks or solar storms or other risks, in marked contrast to the current developments with an exchange via the conventional power supply system and per Smart Grid. In addition, the data exchange should be carried out in such a way that the system requests only the absolutely necessary numbers or data from the respective energy producers or energy consumers, but nothing more. In no case should there be access to, e.g., the whole house or the whole E-motor vehicle.

In principle, a portal for a virtual exchange, so to speak, of the supply and/or demand of energy or power can be provided with the method according to the invention and the supply system according to the invention. This can preferably be done on the local or regional plane, which also should result in an optimization of the behavior with respect to the power or energy consumption and the production. In addition, this can be carried out using a suitable cross-linking of decentralized producers and/or suppliers of energy and optionally their storage units or power storage units with, for example, electric vehicle users or else with other power consumers, specifically without power having to be exchanged or transported over the power line system. For example, an employee of a factory could bring self-produced power in by car and power trailer to work at the factory and optionally also partially back out.

In another embodiment, two electric vehicle users, who are both registered users of the supply system and who each have a specific storage unit inside, can exchange and/or purchase power or electrical energy, even en route, from different sites. With a large enough number of users of this virtual power supply system, it is possible that the range of E-cars, which is still quite limited at present, of approximately 120 to 300 km, could very soon know no limits. In the optimal case, each system user himself or the city dweller, e.g., via his membership in an energy-production cooperative or in other forms of organizations within this virtual power supply system, will produce exactly as much energy as he himself needs and can use the latter anywhere he requires when a system partner is in the vicinity.

Supply of and/or demand for energy can be brought together via a portal locally or super-regionally for various user groups, for example, firms, private citizens, etc., even with specific user groups such as, e.g., cooperatives, associations, etc. The power or the energy can be generated completely on a renewable basis.

In the case of the method and supply system according to the invention, energy can be exchanged in principle. This means no purchasing company need be present in the transfer of energy from one partner to the other partner. As an alternative, a purchasing model can also be used, in which an energy purchase or a power purchase can be carried out for a presettable prepaid amount. This purchase can be carried out at times when the energy cost or the power cost in the energy exchange is near zero or is especially advantageous.

In the case of a supply system that is created according to the invention and that can cover a request temporarily or in principle not quite completely, it is possible to order power or energy via a type of "back-up method" from the conventional supply system. This could be done in principle when little or no renewable power/energy from the supply system according to the invention is available. However, this power ordering/energy ordering from the supply system can be limited to certified producers and/or suppliers of renewable power or renewable energy. In this case, these are producers and/or suppliers who reliably deliver exclusively renewable power or renewable energy. To actually be able to be sure that renewable power exists at present, almost the only possibility is to order certified green electricity via special suppliers, e.g., from Austria or Norway. Since in this back-up case, power—because of the market mechanisms—will usually be as expensive as the power provided according to the invention, the market should help to ensure that the decentralized provided power according to the invention is given preference.

Another advantage of the method and supply system according to the invention consists in that the susceptibility to terrorist attacks is lower, since there are no power line system connections that can be attacked. In this respect, the supply system according to the invention represents a high degree of security.

Movable storage units can be adapted to standard containers in an advantageous way because of their dimensions. In this respect, a transporting of large amounts of electrical energy is made possible in a simple way. For example, in this respect, wind power can be transported over long distances to buyers and/or consumers.

Suitable motor vehicles could have a model-kit-plug-in system for multiple power storage units, for example on a support surface.

In addition, for example, electric vehicle users without their own power source can drive in a town; they may, however, have their own power-generating plant, for example, a photovoltaic plant, outside of the town, e.g., as a cooperative model, as an association, etc., to transport the electrical energy into the town using the movable storage units, whereby such transportation can normally be carried out against the commuter traffic, since the power generation is carried out via, for example, photovoltaic plants during the day and a corresponding trip can be carried out in the town in the evening, when the commuter traffic is usually coming out of town.

In addition, this new virtual form of a power supply system and/or an energy supply system—even the possible virtual heat supply system such as, e.g., with the LaTherm storage units—makes it possible for the supply and demand in power or energy to be able to be balanced in a very much simpler decentralized or regional manner, and thus the purchasing power also remains in the respective region.

This is by no means just about providing energy. In the case of the invention, it is quite especially the virtual supply system and the balancing of the supply and demand of power, or, in a broader sense, of energy, which is made via this platform and without the conventional power supply system or line supply system.

In order to ensure as much as possible the simple exchange of power or energy for all users of this supply system, a corresponding measuring technique and/or interfaces for as many E-vehicles and power storage units as possible is/are supplied in order to be able "to bind" the latter in the system in a simple manner.

There are now various possibilities for configuring and further developing the teachings of this invention in an advantageous way. To this end, reference is made, on the one hand, to the claims following Claim 1 and, on the other hand, to the subsequent explanation of preferred embodiments of the invention based on the drawing. In connection with the explanation of the preferred embodiments of the invention based on the drawing, generally preferred configurations and further developments of the teachings are also explained. In the drawing,

BRIEF DESCRIPTION OF THE DRAWING

FIG. 1 shows, in a diagrammatic depiction, an embodiment of a supply system according to the invention for decentralized provision of electrical energy.

DETAILED DESCRIPTION OF THE PREFERRED EMBODIMENTS

In a diagrammatic depiction, FIG. 1 shows an embodiment of a supply system for decentralized provision of electrical energy. In this case, multiple decentralized producers 1 of electrical energy are arranged in a definable geographic area. Electrical energy can be transported between the producers 1 and consumers 2 of the electrical energy according to the supply and/or demand by means of movable storage units 3—without using any power line system. In this respect, a determination as to a definable type of power with means that are simple in design is made possible. For example, it can be ensured that producers 1 generate, for example, only renewable energy. This energy can then be transported according to the supply and/or demand by means of the movable storage units 3 to consumers 2 or other producers 1. For example, energy can be transported from one producer 1 to another producer 1, when an increased demand for electrical energy is present in the case of this last-mentioned producer 1. In addition, multiple producers 1 can also supply the same consumer 2 with electrical energy.

The movable storage units 3 are transported by means of motor vehicles. The producers 1 form a decentralized supply system to producers 1 for decentralized provision of electrical energy.

Supply and/or demand relative to the electrical energy is/are administered by a central computer, not shown here, or many local or regional supply system computers, which perform a super-regional supply and demand balancing, whereby multiple decentralized computers are more reliable than a single central computer. The monitoring of the supply and/or demand and the reserving of, ordering of, and/or paying for the electrical energy is done with a suitable application software, an app.

In the embodiment shown here, the motor vehicle that transports the storage unit 3 forms the "power line," so to speak, which connects to one another the producers 1 and/or consumers 2 with respect to the transport of electrical energy.

As decentralized producers 1, various systems are suitable, for example a farm, a shopping center, a car dealership, and even private houses. This list is not to be viewed as exhaustive, however.

With respect to additional advantageous configurations of the method according to the invention and the supply system according to the invention, an effort should be made to avoid repetition in the general part of the specification as well as in the attached claims.

Finally, it should be expressly pointed out that the above-described embodiments of the teachings according to the invention are used only for discussing the claimed teachings, but the latter are not limited to the embodiments.

REFERENCE SYMBOL LIST

1 Producer
2 Consumer
3 Storage Unit

The invention claimed is:
1. A method for the decentralized provision of energy in the form of electrical energy or heat, the method comprising:
   multiple decentralized energy producers (1) and/or energy suppliers being arranged in a definable geographic area,
   transporting the energy, in the form of electrical energy or heat, between energy producers (1), energy suppliers, energy buyers, and/or energy consumers (2) according to energy supply and/or demand by use of movable storage units (3) and without using any power line system, wherein the movable storage units (3) are transported by vehicles via individually defined transport paths, and the movable storage units (3) being transported respectively to the energy producers (1) and to the energy consumers (3) for consumption of the energy from the movable storage units (3) respectively by the energy producers (1) and by the energy consumers (3),
   wherein the energy supply and demand relative to the energy used by users are administered by a central computer,
   wherein a monitoring of the supply and demand relative to the energy is carried out by an application software,
   wherein the energy producers and/or energy suppliers form a decentralized supply system, and
   using a measuring technique and/or interfacing to E-vehicles to integrate the users of the decentralized supply system.
2. The method according to claim 1, wherein the vehicles include motor vehicles, and wherein each movable storage unit (3) is assigned to a corresponding one of the motor vehicles.

3. The method according to claim 2, wherein each motor vehicle is a passenger car, a truck, a bus, a motorcycle, or a train car.

4. The method according to claim 3, wherein the movable storage units for the energy are assigned to the producers (1) and/or suppliers.

5. The method according to claim 2, wherein at least one of the motor vehicles is driven electrically.

6. The method according to claim 5, wherein the movable storage units for the energy are assigned to the producers (1) and/or suppliers.

7. The method according to claim 2, wherein at least one of the motor vehicles is driven electrically.

8. The method according to claim 2, wherein the movable storage units for the energy are assigned to the producers (1) and/or suppliers.

9. The method according to claim 2, wherein at least one of the motor vehicles is driven electrically using electrical energy from the movable storage unit (3) that is being transported by the one motor vehicle.

10. The method according to claim 1, wherein the movable storage units for the energy are assigned to the producers (1) and/or suppliers.

11. The method of claim 10, further comprising additional storage units that are stationary.

12. The method according to claim 1, wherein the energy is renewable energy.

13. The method of claim 12, wherein, the energy is produced by at least one of the sun, wind, hydroelectric power, heat, geothermal energy, and biomass.

14. The method according to claim 1, wherein the monitoring of the energy supply and/or demand relative to energy used by the users is made via the Internet.

15. The method of claim 14, wherein the users are registered.

16. The method of claim 15, wherein the monitoring is carried out via an application software on a cell phone.

17. The method according to claim 1, wherein a reserving of, ordering of, and/or paying for energy is carried out via another application software.

18. A supply system for decentralized provision of energy for implementing the method according to claim 1, whereby multiple decentralized energy producers (1) and/or energy suppliers are arranged in a definable geographic area and whereby energy can be transported between energy producers (1), energy suppliers, energy buyers, and/or energy consumers (2) according to the supply and/or demand by means of movable storage units (3) without using any power line system, the supply system comprising a central computer for administering the supply and demand relative to energy, whereby a monitoring of the supply and demand relative to energy can be carried out via an application software.

19. The supply system of claim 18, wherein the energy provided is at least one of electrical energy and heat.

20. The method according to claim 1, wherein the vehicles include a trailer.

* * * * *